US007030363B2

(12) United States Patent
Watanabe et al.

(10) Patent No.: US 7,030,363 B2
(45) Date of Patent: Apr. 18, 2006

(54) SAFETY DEVICE FOR AUTOMATIC MACHINE SYSTEM

(75) Inventors: Atsushi Watanabe, Tokyo (JP); Masaru Oda, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 177 days.

(21) Appl. No.: 10/699,651

(22) Filed: Nov. 4, 2003

(65) Prior Publication Data
US 2004/0089793 A1 May 13, 2004

(30) Foreign Application Priority Data
Nov. 8, 2002 (JP) .............................. 2002/325463

(51) Int. Cl.
*G06M 7/00* (2006.01)
(52) U.S. Cl. ...................... 250/221; 340/552; 340/555; 901/49
(58) Field of Classification Search ................ 250/221, 250/222.1; 340/552, 555, 556, 557, 564, 340/686.1, 686.6; 901/46, 47, 49
See application file for complete search history.

(56) References Cited

U.S. PATENT DOCUMENTS

| | | | | |
|---|---|---|---|---|
| 4,639,591 | A | * | 1/1987 | Barry ........................ 250/221 |
| 4,804,860 | A | * | 2/1989 | Ross et al. .................. 307/117 |
| 5,408,089 | A | * | 4/1995 | Bruno et al. ................. 250/221 |
| 6,166,371 | A | * | 12/2000 | Milbrath et al. ............ 250/221 |
| 6,856,862 | B1 | * | 2/2005 | Feltner ....................... 700/245 |
| 2005/0140513 | A1 | * | 6/2005 | Roed et al. ............... 340/573.4 |

FOREIGN PATENT DOCUMENTS

| | | |
|---|---|---|
| JP | 61-71394 | 5/1986 |
| JP | 03-136790 | 6/1991 |
| JP | 05-146977 | 6/1993 |
| JP | 2002-141273 | 5/2000 |
| JP | 2000-268290 | 9/2000 |

OTHER PUBLICATIONS

Notice of Grounds of Rejection for corresponding Japanese Application No. 2002-325463 mailed Oct. 5, 2004.
Notice of Decision of Final Rejection in corresponding Japanese Patent Application 2003-325463 dated Jul. 1, 2005.

* cited by examiner

*Primary Examiner*—Stephone B. Allen
*Assistant Examiner*—Davienne Monbleau
(74) *Attorney, Agent, or Firm*—Staas & Halsey LLP

(57) ABSTRACT

During a robot is taking workpieces out of a workpiece container 2, a safety fence 2 and a photoelectric sensor 1 are valid and the robot is stopped when the safety fence 2 is opened or a beam from the photoelectric sensor 1 is cut off. A safety fence 1 and a photoelectric sensor 2 are invalid and do not hinder operation of the robot. Operation feasible state indicating lamps of workpiece feeding lamp/switch boxes 1 and 2 are turned on and off, respectively. If an operator replaces a workpiece container 1, he/she actuates an operating area entrance switch or the box 1 into an ON state to make OFF state an operation feasible signal for the robot RB on a side of the workpiece container 1. When the robot is operating on the side of the workpiece container 1, the robot can continue to operate while similarly ensuring safety of the operator.

9 Claims, 3 Drawing Sheets

SAFETY DEVICE FOR AUTOMATIC MACHINE SYSTEM

BACKGROUND OF THE INVENTION

1. Field of the Invention

The present invention relates to a safety device for ensuring safety of an operator in an automatic machine system in which operation is carried out on objects in a plurality of operating areas by using an automatic machine such as a robot and the operator feeds the objects into each of the operating areas from a preparing area adjacent to each of the operating areas.

2. Description of the Related Art

When operation is carried out on objects by using an automatic machine such as a robot, operating areas where the automatic machine carries out operation are provided near the automatic machine in a system, the objects are prepared in preparing areas adjacent to the operating areas, and an operator feeds the objects into the respective operating areas in many cases. In such a system, needless to say, an operator takes care not to enter the operating area during operation of the automatic machine. However, an operator may, through careless, enter the operating area where the automatic machine is carrying out the operation.

Therefore, conventionally, in order to ensure safety of an operator, a method in which operation of the automatic machine is stopped automatically every time the operator enters the operating area and the operation is started again after the operator leaves the operating area, has been employed widely (see Japanese Patent Application Laid-open No. 5-146977, for example). In this method, however, operation has to be stopped frequently for feeding the objects and therefore the method is not efficient. There is also a method in which the objects are fed into each of the operating areas by using a turn table, a slide, or the like instead of feeding the objects by an operator. However, extra devices are necessary for the turn table or the slide and for controlling them.

SUMMARY OF THE INVENTION

According to a first aspect of the present invention, there is provided a safety device for an automatic machine system including a plurality of operating areas in which an automatic machine carries out operation on objects and preparing areas adjacent to the respective operating areas and in which the objects to be fed into the respective operating areas by an operator are prepared. The safety device comprises: first detecting means each disposed between each the operating area and the preparing area to detect entrance of an operator into each the operating area; discriminating means for discriminating the operating area in which the automatic machine is operating; and means for stopping the automatic machine when entrance of an operator into the operating area is detected by the first detecting means corresponding to the operating area which is discriminated by the discriminating means as the area where the automatic machine is operating.

According to a second aspect of the invention, there is provided a safety device for an automatic machine system including an area for installation of an automatic machine, a plurality of operating areas adjacent to the installation area and where the automatic machine enters and carries out operation on objects, and preparing areas adjacent to the respective operating areas and in which the objects to be fed into the respective operating areas by an operator are prepared. The safety device comprises: first detecting means each disposed between each the operating area and the preparing area to detect entrance of an operator into each the operating area; discriminating means for discriminating the operating area in which the automatic machine is operating; means for stopping the automatic machine when entrance of an operator into the operating area is detected by the first detecting means corresponding to the operating area which is discriminated by the discriminating means as the area where the automatic machine is operating; second detecting means each disposed between the installation area and each the operating area to detect entrance of an operator into the installation area; and means for stopping the automatic machine when entrance of an operator into the installation area is detected by the second detecting means corresponding to the operating area other than the operating area which is discriminated by the discriminating means as the area in which the automatic machine is operating.

According to a third aspect of the invention, there is provided a safety device for an automatic machine system including an area for installation of an automatic machine, a plurality of operating areas adjacent to the installation area and where the automatic machine enters and carries out operation on objects, and preparing areas adjacent to the respective operating areas and in which the objects to be fed into the respective operating areas by an operator are prepared. The safety device comprises: first detecting means each disposed between each the operating area and the preparing area to detect entrance of an operator into each the operating area; means for discriminating the operating area in which the automatic machine is operating; means for stopping the automatic machine when entrance of an operator into the operating area is detected by the first detecting means corresponding to the operating area which is discriminated by the discriminating means as the area where the automatic machine is operating; second detecting means each disposed between the installation area and each the operating area to detect at least one of entrance of an operator into the installation area and entrance of an automatic machine into each the operating area; and means for stopping the automatic machine when the second detecting means corresponding to the operating area other than the operating area which is discriminated by the discriminating means as the area where the automatic machine is operating detects at least one of entrance of an operator into the installation area and entrance of the automatic machine into the operating area other than the operating area which is discriminated as the area where the automatic machine is operating.

The safety device for an automatic machine system according to the first to third aspects may further comprise: means for outputting an informing signal for informing of the operating area where the operator is staying, in accordance with the operator's operation; and means for controlling the automatic machine, in response to the informing signal, so that the automatic machine does not enter the operating area where the operator is staying.

According to a fourth aspect of the invention, there is provided a safety device for an automatic machine system including an area for installation of an automatic machine, a plurality of operating areas adjacent to the installation area and where the automatic machine enters and carries out operation on objects, and preparing areas adjacent to the respective operating areas and in which the objects to be fed into the respective operating areas by an operator are prepared. The safety device comprises: first detecting means each disposed between each the operating area and the preparing area to detect entrance of an operator into each the operating area; means for discriminating the operating area in which the automatic machine is operating; means for stopping the automatic machine when entrance of an operator into the operating area is detected by the first detecting means corresponding to the operating area which is discriminated by the discriminating means as the area where the automatic machine is operating; second detecting means each disposed between the installation area and each the operating area to detect entrance of an operator into the installation area and entrance of the automatic machine into each the operating area; means for stopping the automatic machine when the second detecting means corresponding to the operating area other than the operating area which is discriminated by the discriminating means as the area where the automatic machine is operating detects entrance of an operator into the installation area; means for outputting an informing signal for informing of the operating area where the operator is staying in accordance with the operator's operation; and means for stopping the automatic machine when entrance of the automatic machine into the operating area where the operator is staying is detected by the second detecting means corresponding to the operating area, upon receiving the informing signal indicating that the operator is staying.

The safety device for the automatic machine system according to the first to fourth aspects may further comprise indicating means for enabling an operator to recognize the operating area which is discriminated by the discriminating means as the area where the automatic machine is operating. As such an indicating means, a lamp or a buzzer may be used. The automatic machine may be a robot. Safety fences may be used as the first detecting means. Photoelectric sensors may be used as the second detecting means, respectively.

According to the invention, drawbacks in the above prior art are overcome in the system in which the automatic machine carries out the operation on the objects fed into the operating areas and safe feeding of the objects by an operator can be achieved with low-cost means and without decreasing a rate of operation of equipment and productivity.

BRIEF DESCRIPTION OF THE DRAWINGS

The above and other objects and features of the present invention will become apparent from the following description of the embodiment by reference to the accompanying drawings in which.

DESCRIPTION OF THE EMBODIMENTS

Figure 1:
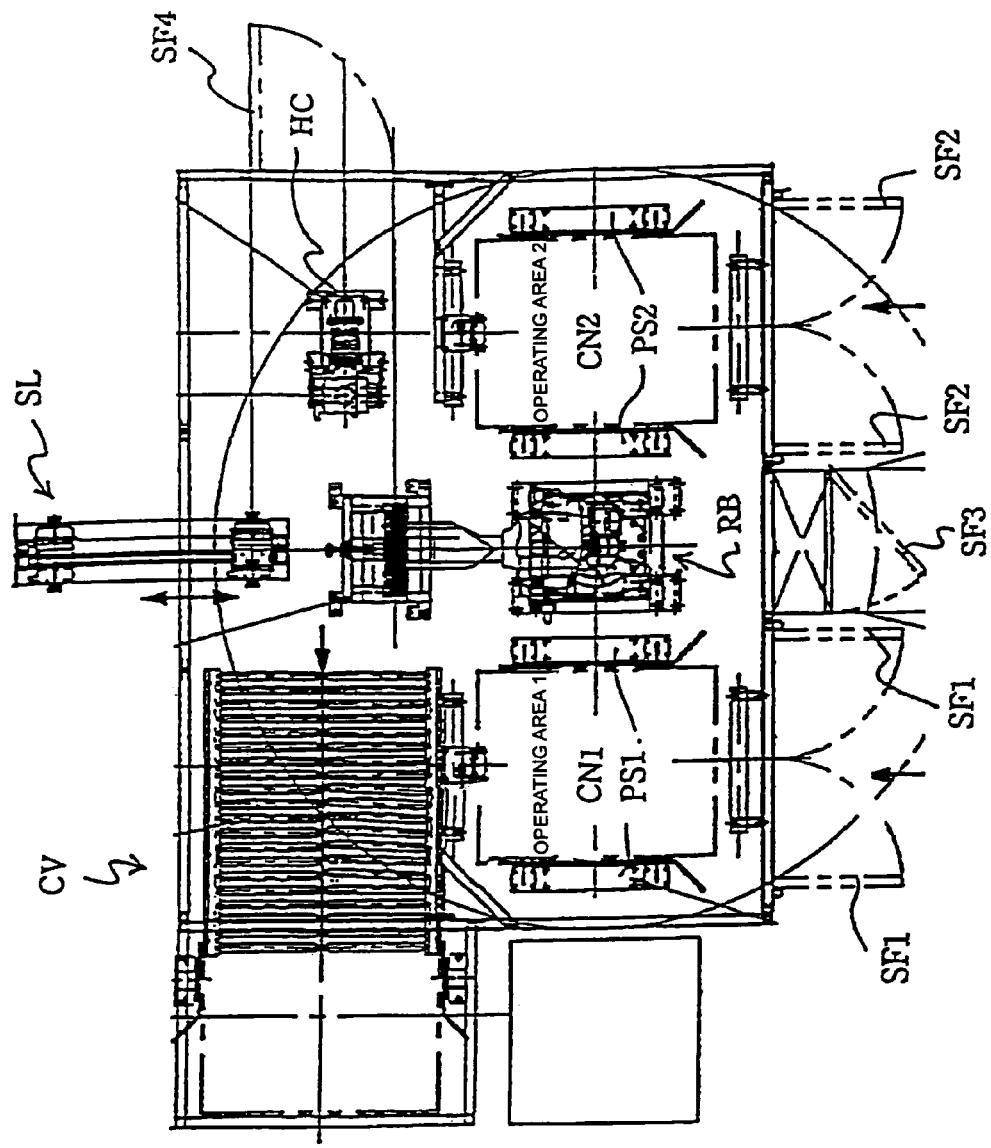
FIG. 1 is a schematic diagram of an overall arrangement of an automatic machine system to which a safety device according to an embodiment of the invention is applied.
Figure 2:
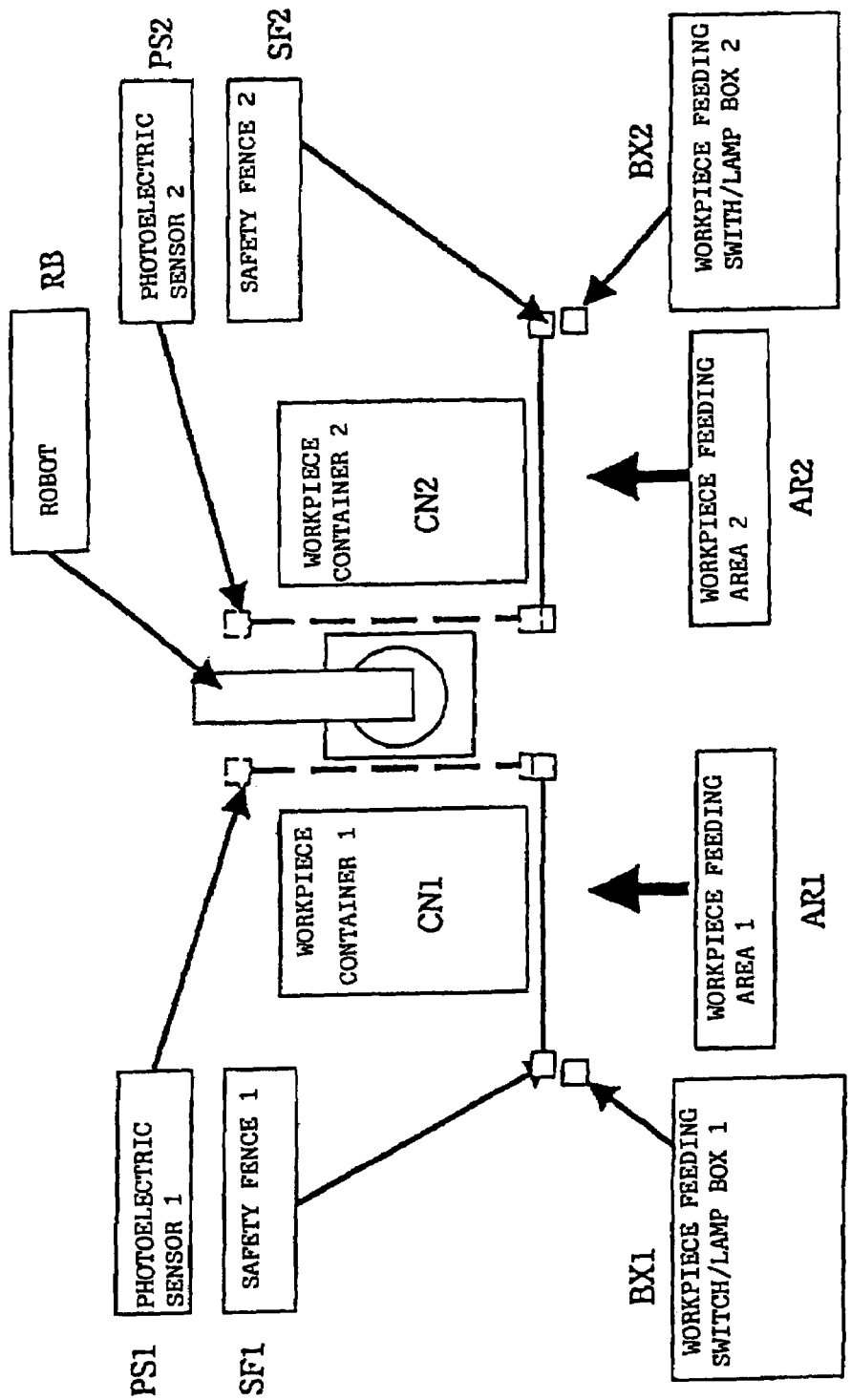
FIG. 2 extracts portions related to the invention from the overall arrangement shown in FIG. 1 and illustrates them in a simplified manner in a block diagram.
Figure 3:
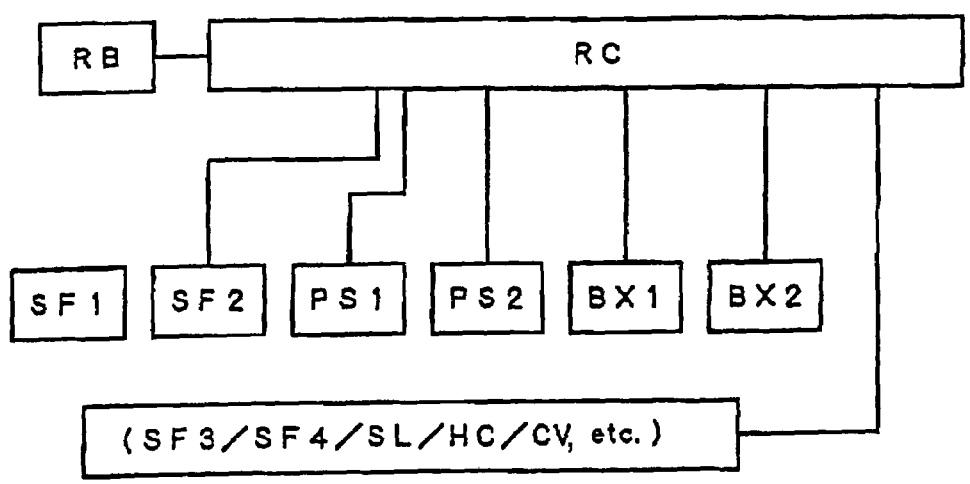
FIG. 3 shows connection between respective portions of the system and a controller (a robot controller) of the system.

FIG. 1 is a schematic diagram of an overall arrangement of an automatic machine system to which a safety device according to an embodiment of the present invention is applied; and FIG. 2 extracts portions included in the overall arrangement shown in FIG. 1 and related to the invention and illustrates them in a simplified manner in a block diagram. FIG. 3 shows connection between respective portions of the system and a controller (here, a robot controller) of the system. By reference to these drawings, the present embodiment will be described below. Although a case in which the automatic machine is a robot and operation is to grasp and carry workpieces will be described in the embodiment, the automatic machine may be another automatic machine (e.g., a machine tool for machining a workpiece by using a movable machining head) for carrying out other operations on objects.

First, by reference to FIG. 1, a robot RB is disposed in an area for installation of the robot and operating areas are prepared on left and right opposite sides of the installation area. In the left operating area (hereafter also referred to as an operating area 1), operation of taking out workpieces (not shown) housed in a workpiece container CN1 is carried out by the robot RB. In the right operating area (hereafter also referred to as operating area 2), operation of taking out workpieces (not shown) housed in a workpiece container CN2 is carried out. The robot RB successively grasps the workpieces in the workpiece container CN1 or CN2 with a hand (not shown), carries them to a position above a slide SL, and places them on the slide SL. The slide SL sends the workpieces placed on the slide SL into an operating area (not shown) for a next step.

In this embodiment, the taking-out operations in these two operating areas 1 and 2 are programmed to be carried out alternately. For example, when the operation of taking the workpieces out of the workpiece container CN1 has advanced and the workpiece container CN1 has become empty, the operation of taking the workpieces out of the workpiece container CN2 is started. Furthermore, when the operation of taking the workpieces out of the workpiece container CN2 has advanced and the workpiece container CN2 has become empty, the operation of taking the workpieces out of the workpiece container CN1 is started.

Workpiece feeding areas AR1, AR2 (reference numerals are omitted in FIG. 1) adjacent to the respective operating areas 1 and 2 are provided and a safety fence 1 and a safety fence 2 shown with reference numerals SF1 and SF2 are provided in boundary portions between the respective workpiece feeding areas AR1 and AR2 and the corresponding operating areas 1 and 2. According to the above-described alternate operations carried out by the robot RB, the empty workpiece container CN1 or CN2 is replaced with another workpiece container in which the workpieces are housed.

In the following description, irrespective of whether the individual container has been replaced, the reference numeral CN1 designates a workpiece container placed in the operating area 1 on a left side of the robot RB in FIGS. 1 and 2 and the reference numeral CN2 designates a workpiece container placed in the operating area 2 on a right side of the robot RB in FIGS. 1 and 2.

In order to thus replenish the empty operating area with workpieces, an operator opens the safety fence 1 or the safety fence 2 when necessary, enters one of the operating areas, and replaces the workpiece container CN1 or CN2. At a time of this entrance of the operator into the operating area, a photoelectric sensor 1 (PS1), a photoelectric sensor 2 (PS2), a workpiece feeding switch/lamp box 1 (BX1), and a workpiece feeding switch/lamp box 2 (BX2) are provided so as to ensure safety of an operator and are connected together with the safety fence 1 (SF1) and the safety fence 2 (SF2) to the robot controller (not shown in FIGS. 1 and 2) as shown in FIG. 3. Control of operations of these components for ensuring safety will be described later.

Provided in addition to the above structure are a safety fence 3 (a reference numeral SF3; not shown in FIG. 2) to be opened for direct access of an operator to the robot RB and a safety fence 4 (a reference numeral SF4; not shown in FIG. 2) to be opened for access of an operator to a conveyor CV or a hand changer HC as shown in FIG. 1. In the workpiece container CN1 or CN2, the workpieces are housed while stacked in a plurality of layers and a partitioning plate (not shown) is sandwiched between the layers. After taking out the workpieces from one layer is finished and before taking out the workpieces from the next layer is started, the robot RC replaces a hand by using the hand changer HC.

Then, the partitioning plate is grasped and placed on the conveyor CV. After that, the hand is reinstalled by using the hand changer HC and taking out the workpieces from the next layer is started. As described above, when one of the workpiece containers CN1 (or CN2) has become empty, the operation of taking out the workpieces in the other workpiece container CN2 (or CN1) is started.

Next, functions of respective portions for ensuring safety of the operator and control related to the functions and carried out by the robot controller RC will be described.

(1) Safety Fences 1 to 4 (SF1 to SF4)

The robot controller RC judges whether each of the safety fences 1 to 4 (SF1 to SF4) is in an open or closed state at predetermined short intervals (ITP). If it is in an open state, a corresponding flag is set to "1". If it is in a closed state, the corresponding flag is set to "0". Here, flags of the safety fences 1 to 4 (SF1 to SF4) are respectively designated by symbols F1 to F4. For example, when only the safety fence 1 (SF1) is open and the other safety fences are closed, F1=1, F2=F3=F4=0.

(2) Photoelectric Sensors 1 and 2 (PS1 and PS2)

The robot controller RC judges whether each of the photoelectric sensors 1 (PS1) and 2 (PS2) is in an ON or OFF state at predetermined short intervals (ITP). If it is in ON state, a corresponding flag is set to "1". If it is in an OFF state, the corresponding flag is set to "0".

Here, the flags of the photoelectric sensors 1 (PS1) and 2 (PS2) are respectively designated by symbols G1 and G2. For example, when the photoelectric sensor 1(PS1) is in ON state and the photoelectric sensor (PS2) is in OFF state, G1=1 and G2=0. The "ON state" of each of the photoelectric sensors 1 and 2 (PS1 and PS2) indicates entrance of the robot RB into the corresponding operating area or entrance of an operator into the installation area of the robot RB from the corresponding operating area and the "OFF state" indicates that the robot RB has not entered the corresponding operating area and that an operator has not entered the installation area of the robot RB from the corresponding operating area.

For this purpose, the photoelectric sensor 1 (PS1) emits a probe beam near a ceiling and emits a probe beam in a curtain shape in boundaries between the respective operating areas and the installation area of the robot.

(3) Workpiece Feeding Switch/Lamp Boxes 1 and 2 (BX1 and BX2)

Each of the workpiece feeding switch/lamp boxes 1 and 2 (BX1 and BX2) is provided with an "operator entrance switch", an "operator leaving switch", and an "operation feasible state indicating lamp". The operator actuates the "operator entrance switch" of the corresponding workpiece feeding switch/lamp box into an ON state before he/she enters the operating area. When the operator has left the area, he/she actuates the "operator leaving switch" into an ON state. When one of the "operator entrance switch" and the "operator leaving switch" is actuated into ON state, the other is automatically brought into OFF state (i.e., not both of them are in the ON or OFF state at the same time).

The robot controller RC judges whether each of the "operator entrance switch" and the "operator leaving switch" of each of the workpiece feeding switch/lamp boxes 1 and 2 (BX1 and BX2) is in the ON or OFF state at predetermined short intervals (ITP) and controls a corresponding flag. Here, a flag indicating a state of the operator entrance switch/operator leaving switch of the workpiece feeding switch/lamp box 1 is W1 and a flag indicating a state of the operator entrance switch/operator leaving switch of the workpiece feeding switch/lamp box 2 is W2.

If the operator entrance switch is in ON state (which means the operator leaving switch is in OFF state), a flag value is "1". If the operator entrance switch is in OFF state (which means the operator leaving switch is in ON state), a flag value is "0". For example, if an operator actuates the operator entrance switch of the workpiece feeding switch/lamp box 1 into ON state and gains access to the workpiece container CN1, for example, then W1=1 and W2=0. After that, if an operator leaves and actuates the operator leaving switch of the workpiece feeding switch/lamp box 1 into ON state, then W1=W2=0.

Turning on and off of the operation feasible state indicating lamp of each of the workpiece feeding switch/lamp box 1 (BX1) and the workpiece feeding switch/lamp box 2 (BX2) are controlled by the robot controller RC. This control will be described in the next section.

(4) Stop of a System Including the Robot RB and Control of Related Respective Portions The flags R1 and R2 indicating an operating state of the robot RB or a state in which the operation can be carried out by the robot RB are set. If the robot RB is operating in the operating area 1, then R1=1 and R2=0. If the robot RB is operating in the operating area 2, then R1=0 and R2=1. During the robot RB is stopped, R1=R2=0. In this connection, the robot controller RC carries out control of the respective portions in the following aspects.

(I) The operation feasible state indicating lamp of the workpiece feeding switch/lamp box 1 (BX1) is turned on when R1=0 and is turned off when R1=1. Similarly, the operation feasible state indicating lamp of the workpiece feeding switch/lamp box 2 (BX2) is turned on when R2=0 and is turned off when R2=1.

(II) According to states (values of F1, F2, G1, and G2) of the safety fences 1 and 2 (SF1 and SF2) and the photoelectric sensors 1 and 2 (PS1 and PS2), the robot RB is stopped as follows and R1=R2=0.

(i) Output signals of the safety fence 1 (SF1) and the photoelectric sensor 2 (PS2) are "valid" when R1=1 and are "invalid" when R1=0 for a stop of the robot RB and the like. In other words, if F1=1 or G2=1 in a state of R1=1 (the robot RB is operating in the operating area 1), the system including the robot RB is stopped in both the cases.

If R1=0, on the other hand, the output signals of the safety fence 1 (SF1) and the photoelectric sensor 2 (PS2) are "invalid" for the stop of the robot RB and the like and processing for stopping the robot RB and others is not performed irrespective the values of F1 and G2.

(ii) Output signals of the safety fence 2 (SF2) and the photoelectric sensor 1 (PS1) are "valid" when R2=1 and are "invalid" when R2=0 for the stop of the robot RB and the like. In other words, if F2=1 or G1=1 in a state where R2=1 (the robot RB is operating in the operating area 2), the system including the robot RB is stopped in both the cases.

If R2=0, on the other hand, the output signals of the safety fence 2 (SF2) and the photoelectric sensor 1 (PS1) are "invalid" for the stop of the robot RB and the like and the processing for stopping the robot RB and others is not performed irrespective the values of F2 and G1.

By controls in (i) (ii), the robot RB can continue to operate while an operator avoids danger as long as the operator operates in the operating area where the robot RB is not operating. If the robot RB enters the operating area 1 when an operator is in the operating area 1, R1=1 is brought about immediately and the output signal of the safety fence 1 (SF1) is made "valid" and the robot RB and others are immediately stopped as long as F1 is "1".

Similarly, if the robot RB enters the operating area 2 when an operator is in the operating area 2, R2 immediately turns to 1 and the output signal of the safety fence 2 (SF2) is made "valid" and the robot RB and others are immediately stopped as long as F2 is "1".

(III) However, in the embodiment, the robot RB is prohibited from entering the operating area as follows as long as an operator has actuated the "operator entrance switch" of the corresponding workpiece feeding switch/lamp box 1 or 2 into ON state and is in the operating area. Therefore, the robot RB does not actually try to enter the operating area where there is an operator unless the operator has forgot to actuate the "operator entrance switch" into ON state or unless the robot RB has operated abnormally.

In other words, flags Q1 and Q2 each for indicating an "operation permitted state" with "1" and an "operation not permitted state" with "0" are set for the respective operating areas in the robot controller RC and are controlled as follows according to the ON/OFF states of the "operator entrance switches" of the workpiece feeding switch/lamp boxes 1 and 2.

(A) Q1=0 when the "operator entrance switch" of the workpiece feeding switch/lamp box 1 (BX1) is in ON state and Q1=1 when the switch is in OFF state.

(B) Q2=0 when the "operator entrance switch" of the workpiece feeding switch/lamp box 2 (BX2) is in ON state and Q2=1 when the switch is in OFF state. By the controls in (A) and (B), the entrance itself of the robot RB into the operating area where there is an operator is prevented.

(IV) Output signals of the safe fences 3 and 4 (SF3 and SF4) are always valid. In other words, if one of the F3 and F4 turns to 1 (opening of the fence), the robot RB and others are immediately stopped.

Lastly, how the safety device in the embodiment works will be described through one actually possible operation procedure.

First, an assumption is made that the robot RB is taking the workpieces out of the workpiece container 2 (CN2) in the operating area 2. In this case, the safety fence 2 (SF2) and the photoelectric sensor 1 (PS1) become valid and the robot RB and other devices are stopped when the safety fence 2 (SF2) is opened or the beam from the photoelectric sensor 1 (PS1) is cut off.

On the other hand, because the safety fence 1 (SF1) and the photoelectric sensor 2 (PS2) are invalid, the robot RB can carry out the taking-out operation while cutting off the beam from the photoelectric sensor 2 (PS2). The devices are not stopped even when an operator opens the safety fence 1, so that the operator can replace the workpiece container 1 (CN1). The robot RB informs the outside of the fact that the robot RB is carrying out operation on the workpiece container 2 (CN2), and therefore the operation feasible state indicating lamp of the workpiece feeding lamp/switch box 2 (BX2) for an operator is turned off. Because the robot RB is not carrying out operation on the workpiece container 1 (CN1), the operation feasible state lamp of the workpiece feeding lamp/switch box 1 (BX1) is on.

An operator sees the operation feasible state indicating lamp of the workpiece feeding lamp/switch box 1 (BX1) is turned on and understands that the devices will not be stopped even if the safety fence 1 (SF1) is opened and that the workpiece container 1 (CN1) can be replaced.

Similarly, an operator sees the operation feasible state indicating lamp of the workpiece feeding lamp/switch box 2 (BX2) is turned off and understands that the safety fence 2 (SF2) is valid and that the devices will be stopped if the safety fence 2 (SF2) is opened. When an operator replaces the workpiece container 1 (CN1), he/she has to actuate the operating area entrance switch of the workpiece feeding lamp/switch box 1 (CN1) into ON state.

Thus, the operation feasible signal W1 in the operating area 1 for the robot RB becomes OFF state (W1=0). After the robot has finished operation on the workpiece container 2 (CN2) during the replacing operation, the robot does not operate on a side of the operating area 1 but comes into a standby state. When an operator has finished the replacing operation of the workpiece container 1 (CN1), he/she actuates the operating area leaving switch of the workpiece feeding lamp/switch box 1 (BX) into ON state (the operating area entrance switch is in OFF state) Thus, the taking-out operation feasible signal W1 for the container 1 (CN1) by the robot RB becomes ON state (W1=1) and the robot RB can operate on a side of the workpiece container 1 (CN1).

Because operation performed during the robot RB is taking out the workpieces from the workpiece container 1 (CN1) is basically similar to the above operation except that the respective devices are reversed, description of the operation will be omitted.

Even if the automatic machine is something other than the robot, it is needless to say that a safety device similar to that in the above embodiment can be formed as long as the automatic machine enters an operating area and carries out operation on an object in a system.

Furthermore, an operation feasible state informing buzzer can be used instead of or in addition to the operation feasible state indicating lamp in the above embodiment. In this case, it is preferable that turning on of the operating feasible state indicating lamp corresponds to "buzzer off" and that turning off of the lamp corresponds to "buzzer on" (so as to add a warning effect to a buzzer sound).

According to the present invention, in the system in which the automatic machine carries out the operation on the objects fed into the operating area, safe feeding of the objects by an operator can be achieved with low-cost means and without decreasing a rate of operation of equipment and productivity.

In other words, because the objects on which the operation is carried out can be fed without stopping the system, the rate of operation of equipment can be enhanced. Special feeders such as a turn table and a slide become unnecessary and cost can be reduced. Moreover, because the automatic machine (e.g., robot) does not enter the area where an operator is operating under the control and because the equipment is stopped instantaneously in case where the automatic machine accidentally enters the area, safety of the operator is ensured.

The invention claimed is:

1. A safety device for an automatic machine system including a plurality of operating areas in which an automatic machine carries out operation on objects and preparing areas adjacent to the respective operating areas and in which the objects to be fed into the respective operating areas by an operator are prepared, the safety device comprising:

first detecting means, disposed between each operating area and preparing area, for detecting entrance of an operator into an operating area;

discriminating means for discriminating the operating area in which the automatic machine is operating;

means for outputting an informing signal for informing of the operating area where an operator is staying, in accordance with an operator's operation;

means for controlling the automatic machine, in response to the informing signal, so that the automatic machine does not enter the operating area where an operator is staying; and means for stopping the automatic machine when entrance of an operator into the operating area is detected by the first detecting means corresponding to the operating area which is discriminated by the discriminating means as the area where the automatic machine is operating.

2. A safety device for an automatic machine system including an area for installation of an automatic machine, a plurality of operating areas adjacent to the installation area and where the automatic machine enters and carries out operation on objects, and preparing areas adjacent to the respective operating areas and in which the objects to be fed into the respective operating areas by an operator are prepared, the safety device comprising:

first detecting means, disposed between each operating area and preparing area, for detecting entrance of an operator into an operating area;

discriminating means for discriminating the operating area in which the automatic machine is operating;

means for stopping the automatic machine when entrance of an operator into the operating area is detected by the first detecting means corresponding to the operating area which is discriminated by the discriminating means as the area where the automatic machine is operating;

means for outputting an informing signal for informing of the operating area where an operator is staying, in accordance with an operator's operation;

means for controlling the automatic machine, in response to the informing signal, so that the automatic machine does not enter the operating area where an operator is staying;

second detecting means, disposed between the installation area and each operating area, for detecting entrance of an operator into the installation area; and means for stopping the automatic machine when entrance of an operator into the installation area is detected by the second detecting means corresponding to the operating area other than the operating area which is discriminated by the discriminating means as the area in which the automatic machine is operating.

3. A safety device for an automatic machine system including an area for installation of an automatic machine, a plurality of operating areas adjacent to the installation area and where the automatic machine enters and carries out operation on objects, and preparing areas adjacent to the respective operating areas and in which the objects to be fed into the respective operating areas by an operator are prepared, the safety device comprising:

first detecting means, disposed between each operating area and preparing area, for detecting entrance of an operator into an operating area;

means for discriminating the operating area in which the automatic machine is operating;

means for stopping the automatic machine when entrance of an operator into the operating area is detected by the first detecting means corresponding to the operating area which is discriminated by the discriminating means as the area where the automatic machine is operating;

means for outputting an informing signal for informing of the operating area where an operator is staying, in accordance with an operator's operation;

means for controlling the automatic machine, in response to the informing signal, so that the automatic machine does not enter the operating area where an operator is staying;

second detecting means, disposed between the installation area and each operating area, for detecting at least one of entrance of an operator into the installation area and entrance of the automatic machine into an operating area; and means for stopping the automatic machine when the second detecting means corresponding to the operating area other than the operating area which is discriminated by the discriminating means as the area where the automatic machine is operating detects at least one of entrance of an operator into the installation area and entrance of the automatic machine into the operating area other than the operating area which is discriminated as the area where the automatic machine is operating.

4. A safety device for an automatic machine system including an area for installation of an automatic machine, a plurality of operating areas adjacent to the installation area and where the automatic machine enters and carries out operation on objects, and preparing areas adjacent to the respective operating areas and in which the objects to be fed into the respective operating areas by an operator are prepared, the safety device comprising:

first detecting means, disposed between each operating area and preparing area, for detecting entrance of an operator into an operating area;

means for discriminating the operating area in which the automatic machine is operating;

means for stopping the automatic machine when entrance of an operator into the operating area is detected by the first detecting means corresponding to the operating area which is discriminated by the discriminating means as the area where the automatic machine is operating;

second detecting means, disposed between the installation area and each operating area, for detecting entrance of an operator into the installation area and entrance of the automatic machine into an operating area;

means for stopping the automatic machine when the second detecting means corresponding to the operating area other than the operating area which is discriminated by the discriminating means as the area where the automatic machine is operating detects entrance of the operator into the installation area;

means for outputting an informing signal for informing of the operating area where an operator is staying in accordance with the operator's operation; and means for stopping the automatic machine when entrance of the automatic machine into the operating area where an operator is staying is detected by the second detecting means corresponding to the operating area, upon receiving the informing signal indicating that the operator is staying.

5. The safety device for an automatic machine system according to claim 1, 2, 3, or 4 further comprising indicating means for enabling an operator to recognize the operating area which is discriminated by the discriminating means as the area where the automatic machine is operating.

6. The safety device for an automatic machine system according to claim 5, wherein the indicating means is a lamp and/or a buzzer.

7. The safety device for an automatic machine system according to claim 1, 2, 3, or 4, wherein the automatic machine is a robot.

8. The safety device for an automatic machine system according to claim 1, 2, 3, or 4, wherein the first detecting means are safety fences.

9. The safety device for an automatic machine system according to claim 2, 3, or 4, wherein the second detecting means are photoelectric sensors.

* * * * *